United States Patent [19]

Imai

[11] Patent Number: 5,604,597
[45] Date of Patent: Feb. 18, 1997

[54] IMAGE COMMUNICATION DEVICE WITH SELECTABLY VARIABLE RESOLUTION CONTROL AND SCAN SPEED CONTROLLED BY THE SELECTED RESOLUTION

[75] Inventor: Takashi Imai, Yokohama, Japan

[73] Assignee: Canon Kabushiki Kaisha, Tokyo, Japan

[21] Appl. No.: 249,929

[22] Filed: May 26, 1994

[30] Foreign Application Priority Data

May 27, 1993 [JP] Japan .................. 5-126178

[51] Int. Cl.$^6$ .................................. H04N 1/04
[52] U.S. Cl. ................ 358/296; 358/474; 347/40; 347/9
[58] Field of Search .................. 358/296, 471, 358/474, 486; 382/312; 347/40, 9

[56] References Cited

U.S. PATENT DOCUMENTS

| | | | |
|---|---|---|---|
| 4,972,270 | 11/1990 | Kurtin et al. | 358/296 |
| 5,359,355 | 10/1994 | Nagoshi et al. | 347/9 |
| 5,404,229 | 4/1995 | Ono et al. | 358/296 |
| 5,469,198 | 11/1995 | Kadonaga | 347/41 |
| 5,481,374 | 1/1996 | Tachibana et al. | 358/444 |
| 5,485,285 | 1/1996 | Tachibana | 358/296 |
| 5,485,286 | 1/1996 | Ejiri et al. | 358/296 |
| 5,488,483 | 1/1996 | Murayama | 358/426 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

Image data transmitted through a line is recorded by conducting main scan by moving a recording head having a plurality of recording elements arranged in a sub-scan direction relative to a record medium in a main scan direction. A resolution in the main scan direction may be set by a user to a desired value through a switch, and the image data is thinned at a predetermined rate in accordance with the selected resolution and the speed to move the record head is increased.

13 Claims, 10 Drawing Sheets

IMAGE COMMUNICATION DEVICE WITH SELECTABLY VARIABLE RESOLUTION CONTROL AND SCAN SPEED CONTROLLED BY THE SELECTED RESOLUTION

BACKGROUND OF THE INVENTION

1. Field of the Invention

The present invention relates to an image communication apparatus for recording a received image on a recording medium by using recording means having a plurality of recording elements arranged thereon.

2. Related Background Art

An image communication apparatus such as a facsimile apparatus having a printing unit which scans a print head having a plurality of recording elements substantially perpendicularly (laterally) to a direction of arrangement of the recording elements, feeds a record sheet in the direction of the arrangement of the recording elements (longitudinally) at the end of each scan, and repeats the above operations to complete the printing of an image on one record sheet has been known.

In such an apparatus, however, a time required to laterally scan the printing head is long and it is not sufficient in terms of a printing speed.

In a printer which uses an ink jet type recording head, one which has an economy mode in addition to a normal record mode has been proposed in order to suppress the amount of ink used.

In the printing method using the economy mode, a printing density is simply reduced by thinning every other lateral line. A user may desire other thinned printing from a standpoint of print quality and the apparatus is not sufficient in terms of functional aspect.

SUMMARY OF THE INVENTION

In the light of the above, it is an object of the present invention to provide an improved image communication apparatus.

It is another object of the present invention to provide an image communication apparatus which allows to change a print quality and a printing speed in accordance with a desire of a user.

It is still another object of the present invention to provide an image communication apparatus which records an image at a recording speed and a record quality determined by a resolution set in accordance with a desire of a user.

It is still another object of the present invention to provide an image communication apparatus capable of recording an image on a record medium at a first resolution in accordance with image data transmitted through a line by record-scanning by using record means having a plurality of recording elements arranged at a predetermined recording density, comprising:

selection means for selecting a resolution of the image to be recorded by said record means;

supply means for dropping the image data at a predetermined rate when a second resolution lower than said first resolution of the image to be recorded by said record means is selected and supplying the dropped image data to said record means; and scan means for conducting the record-scanning of said record means at a high speed in accordance with said second resolution.

The above and other objects will be apparent from the following description and the accompanying drawings.

DETAILED DESCRIPTION OF THE PREFERRED EMBODIMENTS

Figure 1:
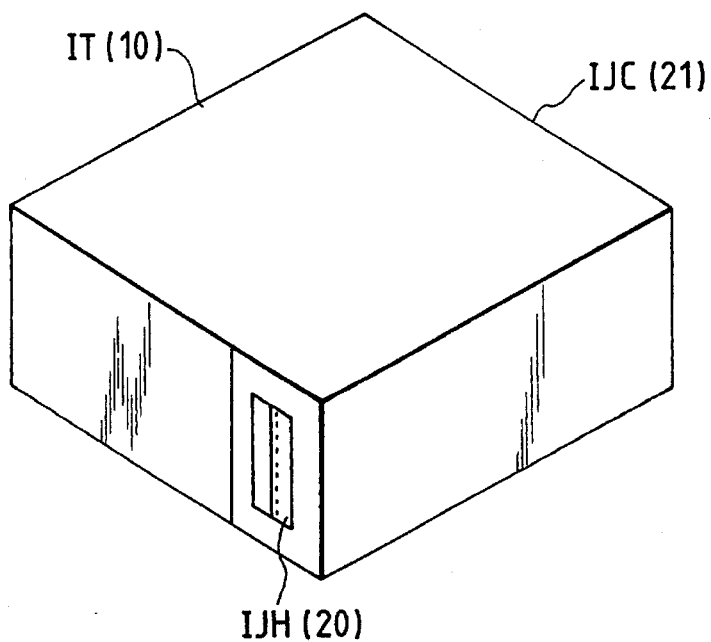
FIG. 1 shows a perspective view of an ink jet cartridge.

Referring to the drawings, the embodiments of the present invention are now described.

Figure 2:
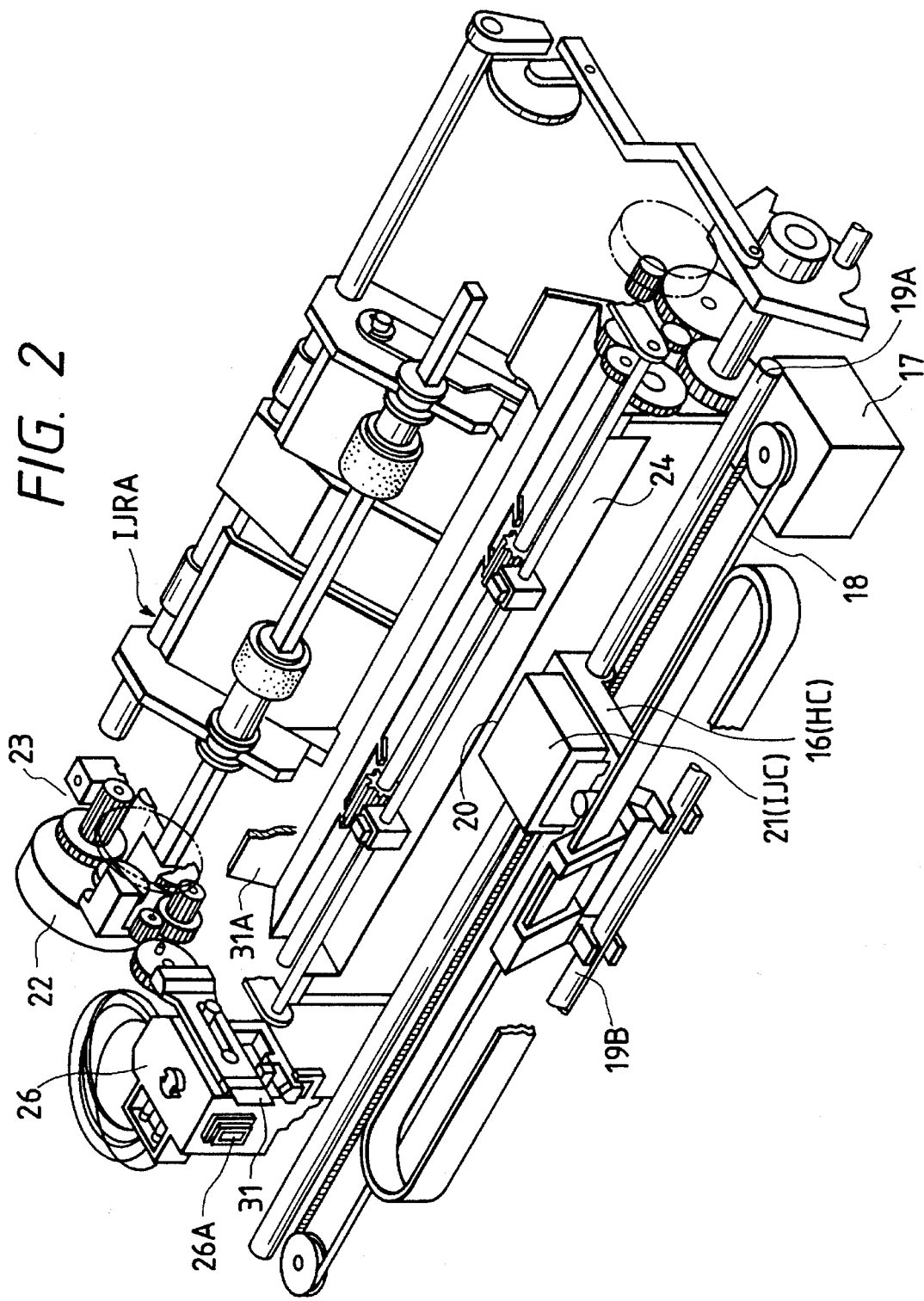
FIG. 2 shows a constriction of a recording unit of a facsimile apparatus which is an example of an image recording apparatus of the present invention.

FIGS. 1 and 2 show constructions of an ink jet printer which is suitable for a recording unit of a facsimile apparatus in accordance with the present invention. In the figures, IJH denotes an ink jet head (hereinafter referred to as a recording head or simply a head) of a type which discharges ink to a recording sheet by using bubbles generated by a thermal energy, IJC denotes a loadable ink jet cartridge (hereinafter referred to as a cartridge) which is integral with the head IJH and has a tank IT for supplying ink to the head, and IJRA denotes an ink jet recording apparatus main body.

In the present embodiment, the cartridge IJC has a leading end of the head IJH slightly protruded from a front side of the ink tank IT, as seen from a perspective view of FIG. 1. The cartridge IJC is fixedly supported by a carriage HC which is mounted on the ink jet recording apparatus main body IJRA to be described later, and it is of disposable type and removable from the carriage HC.

The ink tank IT which contains the ink to be supplied to the head IJH comprises an ink absorber, a container for accommodating the ink absorber and a cover for sealing the container (all of which are not shown). Ink is filled in the ink tank IT and the ink is sequentially supplied to the head as the ink is discharged.

The cartridge IJC thus constructed is removably mounted in a predetermined manner on the carriage HC of the ink jet recording apparatus IJRA to be described later, and a relative movement between the carriage HC and the recording medium is controlled in response to the input of a predetermined record signal so that a desired record image is formed.

FIG. 2 shows a perspective view of an example of the ink jet recording apparatus IJRA having a mechanism for the processing described above.

In FIG. 2, numeral 20 denotes a head of a cartridge (IJC) 21 having nozzles for discharging ink to face a recording plane of a recording sheet fed over a platen 24. Numeral 16 denotes a carriage HC for holding the recording head 20. It is linked to a portion of a drive belt 18 which transmits a driving force of a driving motor 17 and is slidable to a pair of parallelly arranged guide shafts 19A and 19B so that reciprocal movement of the recording head 20 over the entire width of the recording sheet is attained. During the reciprocal movement, the recording head 20 records an image for the received data on the recording sheet. At the end of each one main scan, the recording sheet is fed by a predetermined amount to conduct a sub-scan.

Numeral 26 denotes a head recovery unit which is arranged at one end of the movement path of the recording head 20. The head recovery unit 26 is operated by a driving force of a motor 22 through a transmission mechanism 23 to cap the recording head 20. In connection with the capping unit for the recording head 20 by a cap device 26A of the head recovery unit 26, the ink is sucked (ink recovery) by appropriate suction means (for example, a suction pump) provided in the head recovery unit 26 so that the discharge recovery process such as the removal of high viscosity ink in the discharge ports is conducted. At the end of recording, the capping is made to protect the recording head 20. The discharge recovery process is conducted in a period in during which no recording is conducted for a predetermined time period, such as at the time of power-on or at the time of replacement of the recording head.

Numeral 31 denotes a blade serving as a wiping member made of silicone rubber and arranged on a side of the recovery unit 26. The blade 31 is held by a holding member 31A in a cantilever fashion, and it is operated by the motor 22 and the transmission mechanism 23 as the head recovery unit 26 is, to engage with the discharge plane of the recording head 20. Thus, the blade 31 is engaged with the discharge plane of the recording head 20 at an appropriate timing in the recording operation of the recording head 20 or after the discharge recovery process using the head recovery unit 26 to wipe off the dewdrops, moisture or dusts on the discharge plane of the recording head 20.

(Embodiment 1)

Figure 3:
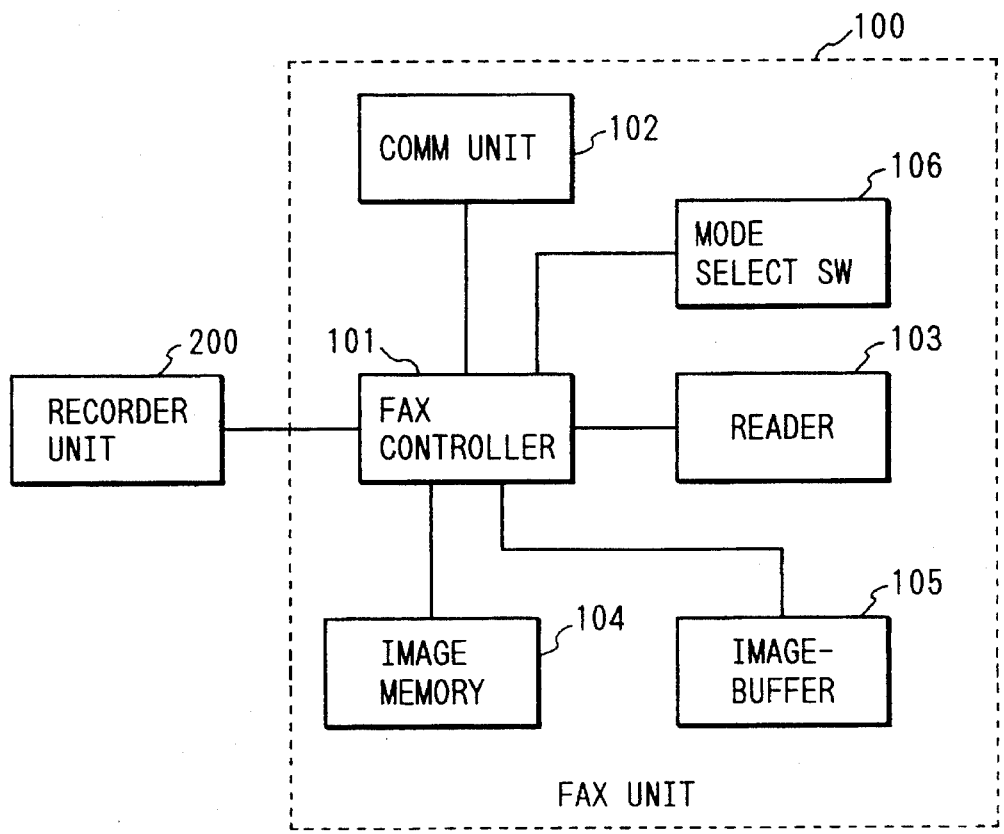
FIG. 3 shows a configuration of a facsimile unit of the facsimile apparatus of the present invention.

FIG. 3 shows a block diagram of a configuration of a facsimile unit 100 of the facsimile apparatus. In FIG. 3, the facsimile unit 100 is primarily constructed by a microcomputer and it comprises a facsimile control unit 101 for controlling the entire apparatus, a communication unit 102 including a modulation circuit and a network control circuit, a reader 103 for reading a document sheet, an image memory 104 for temporarily storing image data, an image buffer 105 for temporarily storing the image data read from the image memory 104 and converted to a resolution of a recording unit, and a switch 106 for switching between a high quality mode and a high speed/economy mode by an operator. It is connected to the recording unit 200 which records the facsimile image through the Centronics interface.

Figure 4:
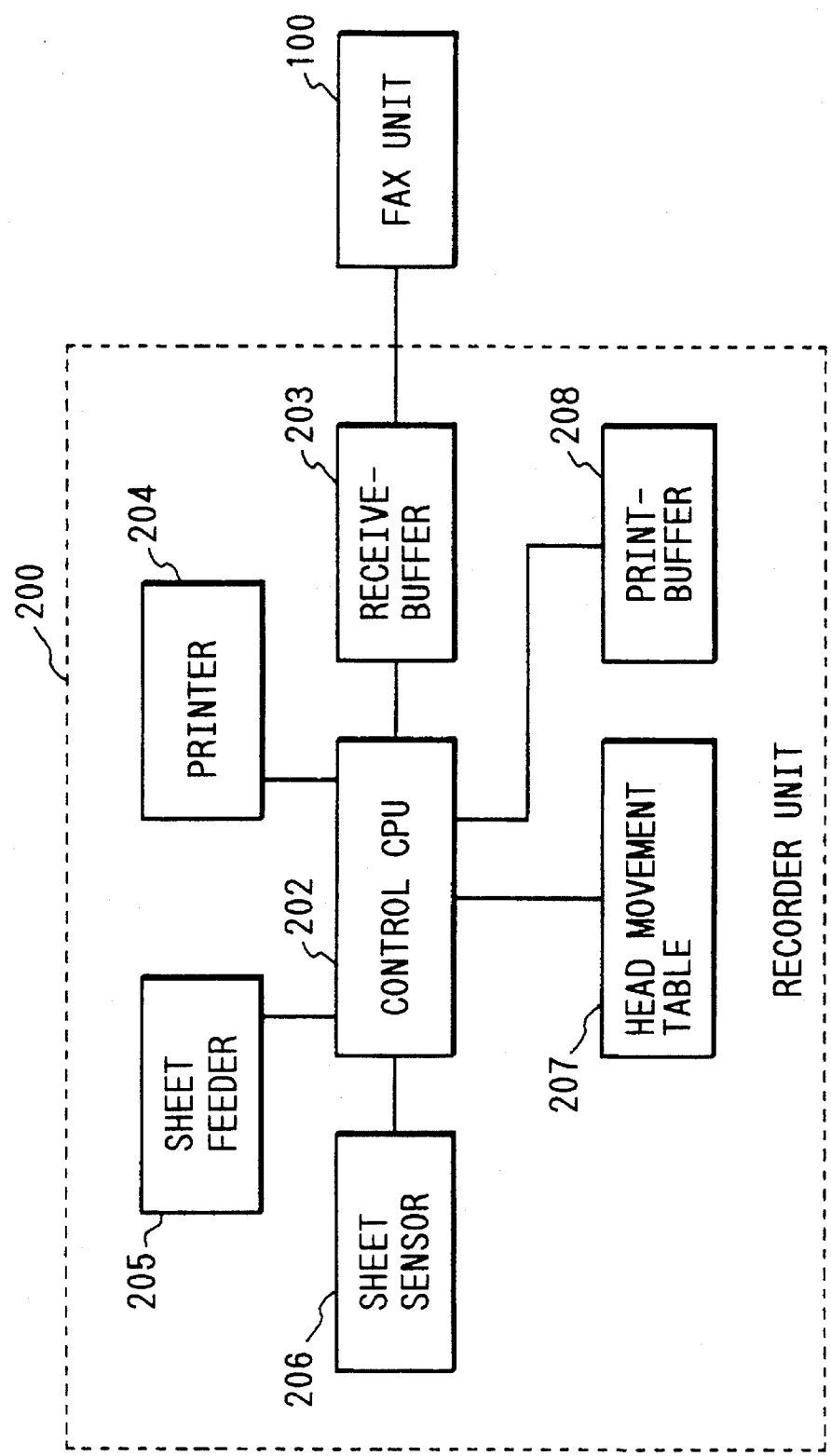
FIG. 4 shows a block diagram showing a configuration of the recording unit of the facsimile apparatus.

FIG. 4 shows a block diagram of a configuration of the recording unit 200 of the facsimile apparatus. In FIG. 4, the recording unit 200 primarily constructed by a microcomputer and it comprises a record control unit 202 for controlling the entire recording unit, a receive buffer 203 which temporarily store control codes and print data sent from the facsimile control unit 101 of the facsimile unit 100, a print unit 204 which has a print head for discharging ink and prints one belt of data by scanning the print head in a main scan direction, a record sheet transport unit 205 for transporting a record sheet at a precision of 360 dpi to feed and eject the record sheet and position the record sheet in the sub-scan direction when the recording is made by the print unit 204, a record sheet sensor 206 which detects the presence and absence of the record sheet to indicate the presence of record sheet when it is present and the absence of record sheet when it is exhausted and detects a leading edge of the record sheet during the feeding of the record sheet or a trailing edge during the ejection of the record sheet, a print head movement table 207 for determining a movement velocity of the print head of the printing unit 204, and a print buffer 208 for temporarily storing a print bit image.

Figure 5:
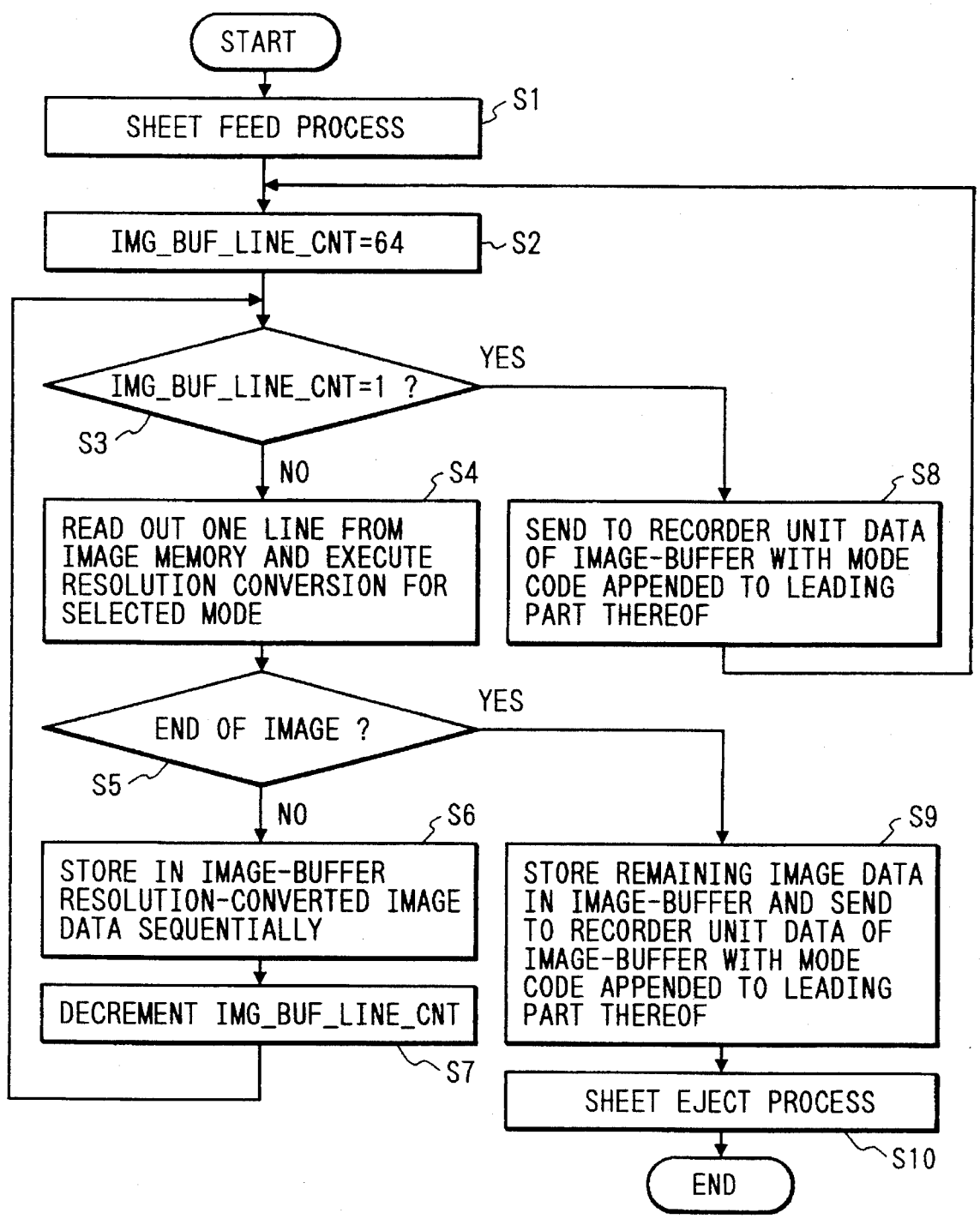
FIG. 5 shows a flow chart showing a page recording process for printing one page of image stored in an image memory of the facsimile unit.

FIG. 5 shows a flow chart of a page recording process for printing one page of image stored in the image memory 104 of the facsimile unit 100. The print operation of the facsimile unit 100 is explained with reference to the flow chart.

When the facsimile unit 100 has data to be recorded, it sends a sheet feed command code to the recording unit 200 in a signal format of the Centronics interface (S1).

The print head used in the present embodiment has 64 nozzles in one line at a density of 360 dpi in a sub-scan direction (a longitudinal direction of the record sheet) and the print head is scanned by the carriage at 360 dpi in a main scan direction to attain a print density of 360 dpi×360 dpi. The number of lines which can be printed in one scan is equal to 64 lines, which is set to an img_buf_line_cnt provided in a counter area of a RAM in the facsimile control unit 101 (S2).

Whether one scan (64 lines) of image data has been prepared or not is determined (S3). If it has been prepared, the data of the image buffer 105 having a control code for one scan printing and a high quality/economy mode setting code added at the top thereof are sequentially sent to the recording unit 200 (S8) to start the printing in the recording unit 200. Thereafter, the preparation of new one scan data is started. In the present embodiment, since the print width of the record sheet is 8 inches in horizontal, the image data of (360 dpi×8 inches)×64 lines (unit bits) is stored in the image buffer 105 in the high quality mode and it is sent to the recording unit 200. In the economy mode, it is (300 dpi×8 inches)×64 lines (unit bits).

If one scan of image data has not been prepared, one line of raw image data is read from the image memory 104 and simultaneously therewith, the facsimile image is converted to a resolution for the recording unit (S4). Since the facsimile image has a resolution of 8 pels/mm in the main scan direction and 3.85 or 7.7 lines/mm in the sub-scan direction, it is necessary to converts the resolutions of the main scan direction and the sub-scan direction to 360 dpi, respectively. The high quality/economy mode switch 106 is referred, and if it is in the economy mode, the resolution in the main scan direction is suppressed to 300 dpi to comply with the 360/300 times of recording speed and the 300/360 times of ink consumption. Then, whether that line is the end of the image or not is determined (S5), and if it is the end, the remaining image data is stored in the image buffer, and the data of the image buffer having the control code for one scan printing and the high quality/economy mode setting code added to the top thereof are sequentially sent to the recording unit (S9) to start the last printing by the recording unit. Thereafter, an eject command is sent to the recording unit (S10) to complete the print operation.

If that line is not the end of the image, the image data having the resolution thereof converted two steps before is sequentially stored in the image buffer (S6). Then, the content of the img_buf_line_cnt is decremented and the process returns to the end of one scan decision step.

Figure 6:
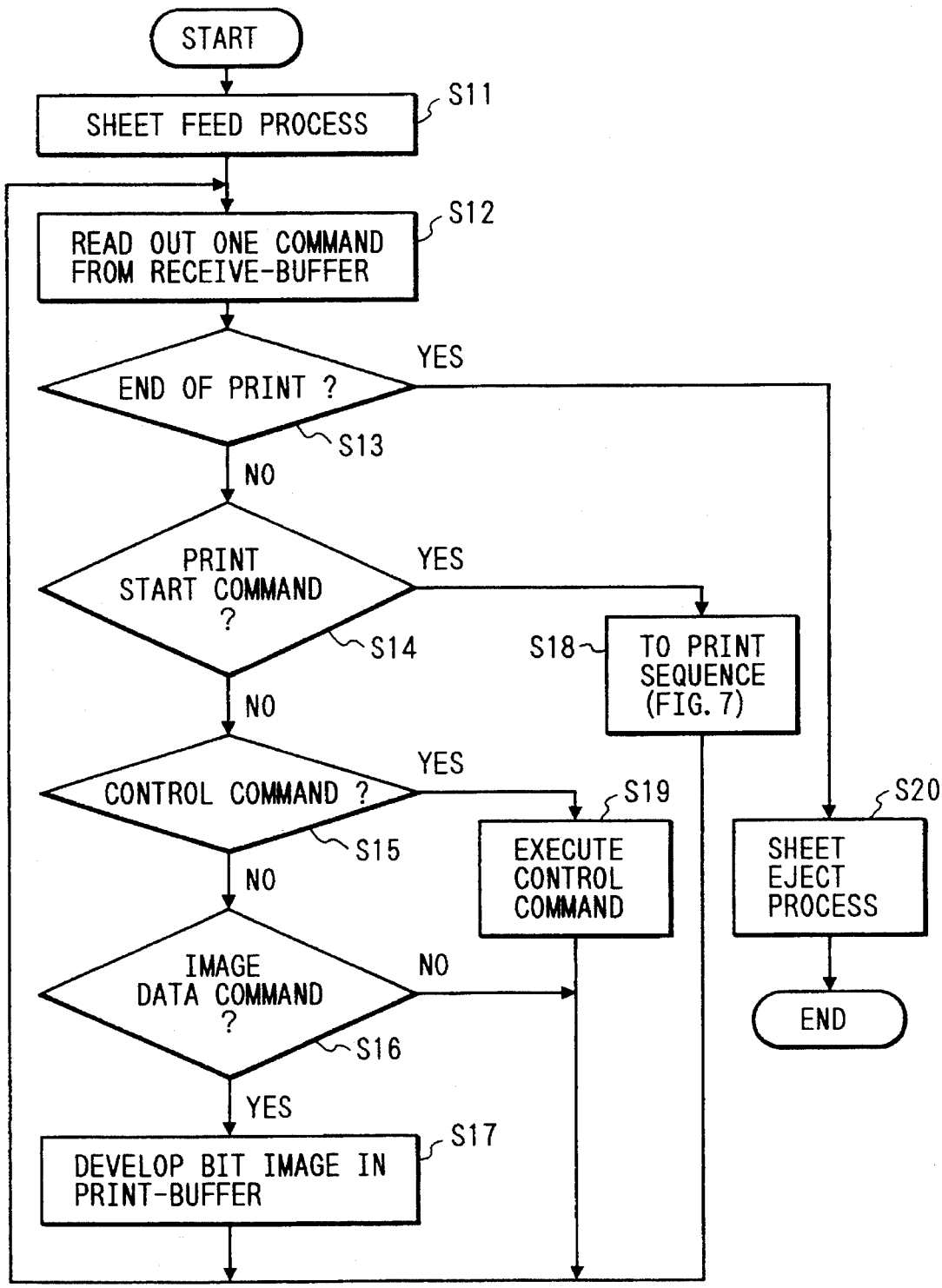
FIG. 6 shows a flow chart of a printing operation in the print unit.

Referring to FIG. 6, the print operation in the recording unit is explained.

It is assumed that the initialization of the recording unit 200 has been completed. In response to a sheet feed command from the facsimile unit 100, the sheet feed operation is conducted (S11). After the recording head 20 has been retracted to prevent it from contacting to the record sheet, the record sheet is fed by the record sheet transport unit, and the presence or absence of the record sheet is detected and the trailing edge of the record sheet is positioned by the record sheet sensor 206 arranged in front of the recording position by the recording head 20. Then, the sheet feed is terminated. Then, one command is fetched from the receive buffer 203 (S12) and the address of the receive buffer 203 is advanced to the address of the next command.

The fetched command is decoded and executed as it is. If it is an end of printing command, the remaining sheet is ejected out of the apparatus and the print operation is terminated (S13, S20). Namely, after the recording head 20 has been retracted to prevent from being contacted to the record sheet, the record sheet is fed by the record sheet transport unit until the record sheet sensor 206 detects the absence of the record sheet.

Figure 7:
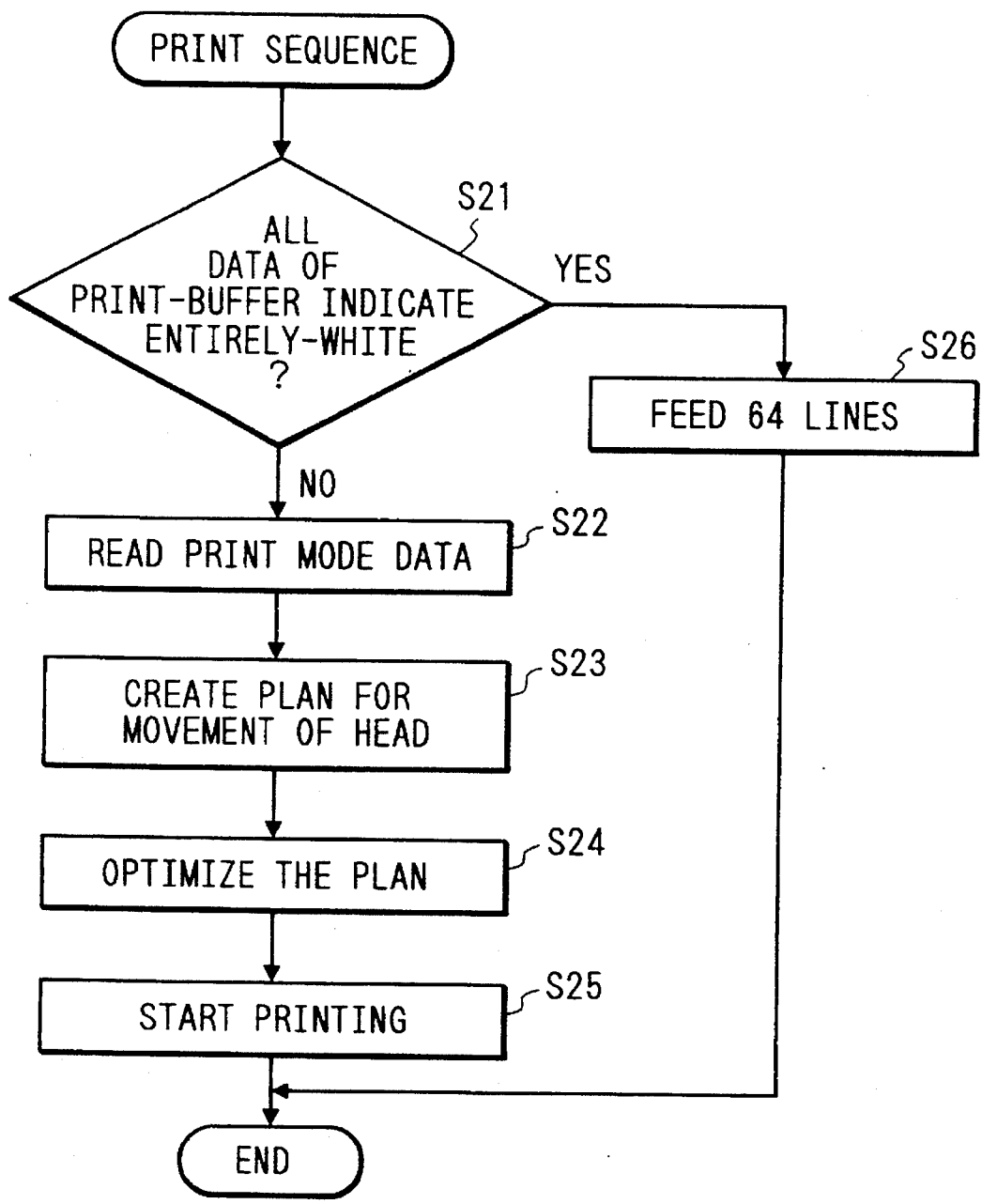
FIG. 7 shows a flow chart showing a print sequence in the print unit.

If it is a print start command (S14), the printing is made on the record sheet in the sequence shown in FIG. 7 (S18). The detail of the print sequence will be described later. If it is the control command to the recording unit (S15), for example, the setting of the high quality/economy mode or the line space, it is executed as it is (S19). Thereafter, the process returns to the step to fetch the next command from the receive buffer 203.

If it is an image data command (S16), one line of image data following to the command is stored in the print buffer 208 (S17). Thereafter, the process returns to the step to fetch the next command from the receive buffer 203.

Since the print area for one scan of the print buffer 208 is 8 inches in horizontal×64 dots in vertical, the image data of (360 dpi×8 inches)×64 lines (unit bits) is stored in the print buffer in the high quality mode. In the economy mode, it is (360 dpi×8 inches)×64 line (unit bits). The print buffer 208 is provided with two planes each having the area of (360 dpi×8 inches)×64 lines (unit bits) so that a development buffer and a printing buffer are alternately set to reduce the recording time.

Referring to FIG. 7, the print sequence in the printing unit 200 is explained.

When the print start command is sent from the facsimile unit 100 or the print buffer 208 becomes full, the print operation is started. First, the content of the print buffer 208 is scanned to determine if the content of the buffer is entirely white or not (S21). If it is entirely white, the recording head 20 is not scanned to reduce the recording time, and the record sheet is fed by 64 lines and the print operation for one scan is completed (S26). Then, the high quality/economy mode is read (S22). Then, the movement speed plan for the recording head 20 is prepared (S23). In one scan, the recording head 20 passes through acceleration region, constant speed stable region, print region, constant speed stable region and deceleration region. In each region, if the movement speed of the recording head 20 is different and there is more than a predetermined area of blank area in the print region, the recording head 20 is accelerated or decelerated. The movement speed plan is prepared by referring the recording head movement table. If the mode read in the previous step is the economy mode, the head movement speed in the print region is set to 360/300 times of that of the high quality mode. The prepared movement plan is optimized (S24). Where there is print data at only the left end of the print buffer 208, the head need only be scanned at only the left end to discharge the ink and need not be scanned to the right end. Where there is print data at only the right end, the head is scanned to the right end at the highest speed and the speed is reduced only in the area in which the data is present to conduct the printing. Such optimization is carried out in this step. The head is moved in accordance with the optimized recording head movement plan prepared in the previous step to discharge the ink to conduct the printing (S25). When the printing is completed, the content of the print buffer 208 is cleared.

In the present embodiment, the ink discharge frequency is constant without regard to the mode.

(Embodiment 2)

In the embodiment 1, the normal mode and the economy mode are switched by the mode switch 106 of the facsimile apparatus and the resolution is fixed to 360 dpi in the normal mode and 300 dpi in the economy mode.

In the present embodiment, the resolution of the economy mode is variably set by the registration of function.

Figure 8:
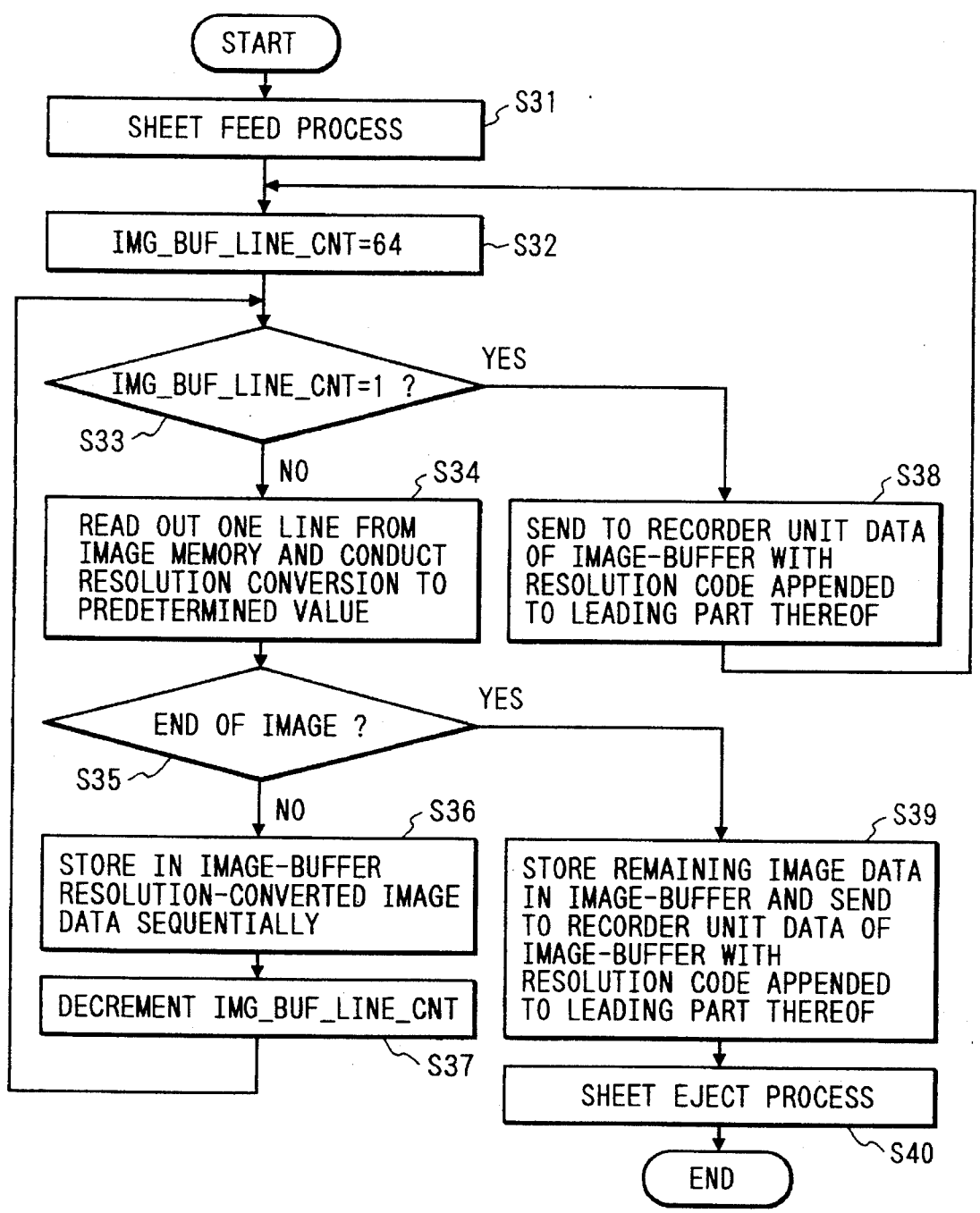
FIG. 8 shows a flow chart showing a page recording process for printing one page of image stored in the image memory of the facsimile unit.

FIG. 8 shows a flow chart of a page recording process for printing one page of image stores in the image memory 104 of the facsimile unit 100 in the present embodiment. The same steps as those of the embodiment 1 are not explained here. A user predesignates a resolution by the registration of function of the facsimile apparatus. The entry is made by entering the resolution through a ten-key of a console unit and registering it in a RAM in the facsimile control unit 101. The resolution may be either high or low. For example, it may be 200 dpi or 500 dpi.

Whether one scan (64 lines) of image data has been prepared or not is determined (S33). If it has been prepared, the data of the image buffer 105 having a control code for one scan printing, a high quality/economy setting code and a resolution setting code added to the top thereof is sequentially sent to the recording unit to start the printing in the recording unit 200 (S38). Thereafter, new one line scan of data is prepared. In the present embodiment, since the print width of the record sheet is 8 inches in horizontal, image data of (360 dpi×8 inches)×64 lines (unit bits) is stored in the image buffer 105 in the high quality mode and it is sent to the recording unit. In the economy mode, it is (function registration value×8 inches)×64 lines (unit bits). If one scan of image data has not been prepared, one raw line of image is read from the image memory 104 and simultaneously therewith, the facsimile image is converted to the resolution of the recording unit. Since the resolution of the facsimile image is 8 pels/mm in the main scan direction and 3.85 or 7.7 lines/ram in the sub-scan direction, it is necessary to convert the resolutions of both main scan and sub-scan directions to 360 dpi, respectively. The high quality/economy mode switch is referred and if it is in the economy mode, the resolution conversion for the main scan is set to the function registration number to comply with the (360/function registration value) times of recording speed and the (function registration value/360) times of ink consumption.

If that line is the end of image, the remaining image data is stored in the image buffer 105, and the data of the image buffer 105 having the control code for one scan printing, the high quality/economy mode setting code and the resolution setting code added to the top thereof is sequentially sent to the recording unit 200 to start the last printing by the recording unit 200 (S35, S39). Thereafter, an eject command is sent to the recording unit 200 and the print operation is terminated.

If it is not the end of the image, the image data having the resolution thereof converted two steps before is sequentially stored in the image buffer 105 (S36). Then, the content of the img_buf_line_cnt is decremented (S37) and the process returns to the step to terminate one scan.

Figure 9:
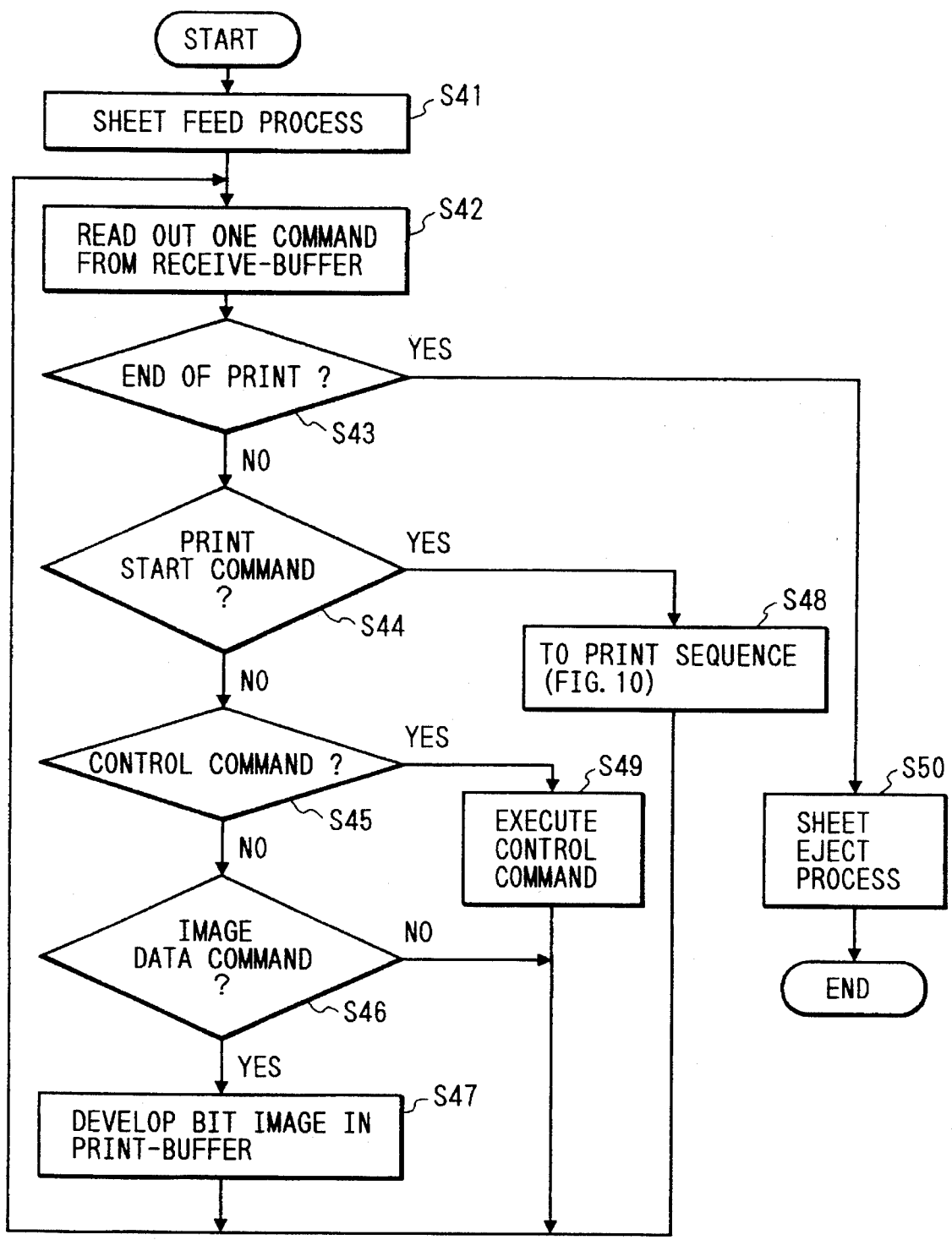
FIG. 9 shows a flow chart showing a print sequence in the print unit.

Referring to FIG. 9, the print operation in the recording unit 200 is explained.

It is assumed that the initialization has been completed in the recording unit.

In response to the sheet feed command from the facsimile unit 100, the sheet feed is conducted (S41). After the recording head has been retracted to prevent it from contacting to the record sheet, the record sheet is fed by the record sheet transport unit 205, and the presence or absence of the record sheet is detected and the leading edge of the record sheet is positioned by the record sheet sensor 206 which is arranged in front of the recording position by the recording head 20, and the sheet feed is terminated.

One command is fetched from the receive buffer 203. The address of the receive buffer 203 is advanced to the address of the next command.

The fetched command is decoded and executed as it is. If it is the end of printing command (S43), the remaining sheet is ejected out of the apparatus and the printing is terminated. After the recording head has been retracted to prevent it from contacting to the record sheet, the record sheet is fed by the record sheet transport unit 205 until the record sheet sensor detects the absence of the record sheet.

Figure 10:
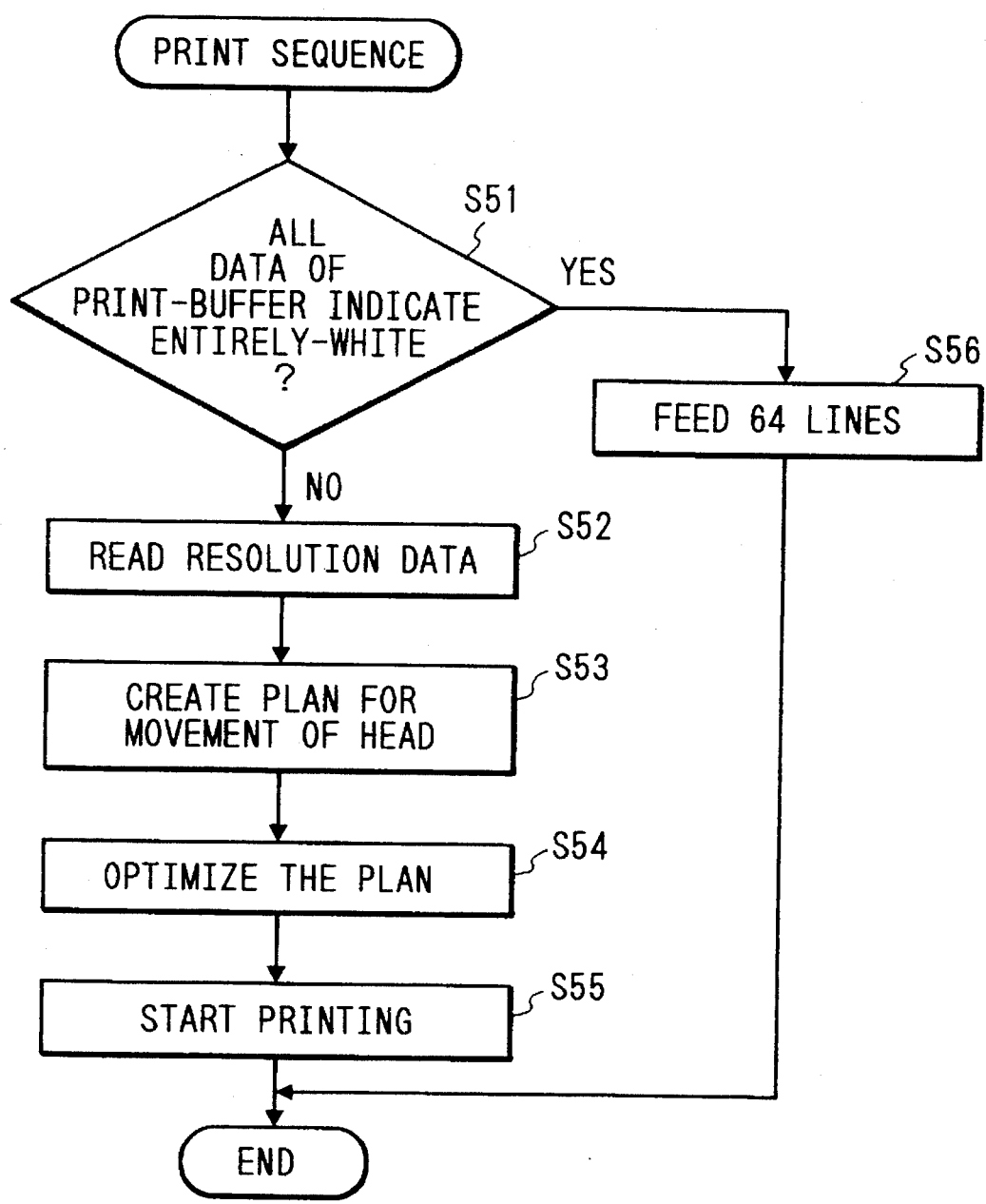
FIG. 10 shows a flow chart showing a print sequence in the print unit.

If it is the start of printing command (S44), the printing is made on the record sheet by a sequence shown in FIG. 10 (S48). The detail will be described later.

If it is the control command to the recording unit 200 (S45), for example, the setting of the high quality/economy mode or the line space (S49), it is executed as it is. Thereafter, the process returns to the step to fetch the next command from the receive buffer 203.

If it is the image data command (S46), one line of image data following to the command is stored in the print buffer 208 (S47). Thereafter, the process returns to the step to fetch the next command from the receive buffer 203. Since the print area of the print buffer 208 in one scan is 8 inches in horizontal and 64 dots in vertical, the image data of (360 dpi×8 inches)×64 lines (unit bits) is stored in the print buffer 208 in the high quality mode. In the economy mode, it is 1 (function registration value×8 inches)×64 lines (unit bits). The print buffer 208 is provided with two planes each having an area of (360 dpi×8 inches)×64 lines and the development buffer and the printing buffer are alternately set to reduce the recording time.

Referring to FIG. 10, the print sequence in the recording unit 200 is now explained.

When the start of print command is sent from the facsimile unit 100 or the print buffer 208 becomes full, the print operation is started.

The content of the print buffer 208 is scanned to determine if the print data in the buffer is entirely white or not (S51). If the print data in the buffer is entirely white, the recording head 20 is not scanned to reduce the recording time and the record sheet is fed by 64 lines, and one scan of print operation is completed (S56).

If the print data in the buffer is not entirely white, the selected mode (the high quality/economy mode) and the registered resolution are read (S52).

Then, the movement speed plan for the recording head 20 is prepared (S53). In one scan, the recording head 20 passes through the acceleration region, constant speed stable region, print region, constant speed stable region and deceleration region. In each region, the movement speed of the recording head 20 differs, and if there is blank area of more than a predetermined area in the print area, the recording head is accelerated and decelerated. The movement speed plan is prepared by referring to the recording head movement table. If the mode read in the previous step is the economy mode, the head movement speed in the print region is set to (360/function registration value) times of that in the high quality mode.

The prepared movement plan is optimized (S54). Where there is print data at only the left end of the print buffer, the head need only be scanned at the left end to discharge the ink and need not be scanned to the right end. If there is print data at only the right end, the head is scanned to the right end at the maximum speed with a reduced speed in only the data area to print it. Such optimization is conducted in this step.

In accordance with the optimized movement plan of the recording head prepared in the previous step, the head is moved to discharge the ink to conduct the printing (S55). When the printing is completed, the content of the print buffer 208 is cleared.

(Embodiment 3)

In the embodiments 1 and 2, the normal mode and the economy mode are switched by the mode switch of the facsimile apparatus. Alternatively, the shift to the economy mode may be set by a read mode.

When a document sheet is read in the facsimile apparatus, the resolution of the main scan is fixed but the reading resolution of the sub-scan is variable. Accordingly, the resolution may be selected to the reading resolution of the sending station in the facsimile receiving mode, and in the copy mode, the mode may be selected by the reading resolution of its own apparatus so that the printing is made in the economy mode in the low resolution mode and in the normal mode in the high resolution mode. Or the reverse thereof may also be implemented.

(Embodiment 4)

The shift to the economy mode in which the recording is made in the registered low resolution may be set by the amount of remaining record medium.

Where the ink is used for the record medium, the amount of remaining ink may be roughly determined by counting the total amount of ink discharge from the replacement of the ink tank. The amount of remaining ink may also be determined by the tank weight or by seeing through the tank. If the amount of remaining ink is below predetermined level, the automatic shift to the economy mode is made to suppress the consumption of the ink to permit higher volume of printing. Further, the resolution of the economy mode may be changed in accordance with the amount of remaining ink.

(Embodiment 5)

The shift to the economy mode in which the printing is made at the registered low resolution may be set by the capacity of the vacant image memory.

In a recent facsimile apparatus, it is common to provide an image memory in a RAM to provide a memory transmit/receive function or a memory copy function. The memory receive function may reduce the communication time but it may cause a communication error when the image memory becomes full. In the facsimile apparatus which takes a long time to record the image, a possibility that the image memory becomes full is higher. Thus, the remaining capacity of the image memory is always monitored in the receive or copy mode, and when the remaining capacity of the memory is below a predetermined level, the mode is automatically shifted to the economy mode to reduce the possibility of the image memory full.

(Embodiment 6)

The shift to the economy mode in which the recording is made at the registered low resolution may be set by the amount of unprinted received image memory content.

In the recent facsimile apparatus, it is common to provide the image memory in the RAM to provide the memory transmit/receive function or the memory copy function. In such a system, the image data is once stored in the image memory and the printing is started when a predetermined amount of image data is stored in the memory. In the facsimile apparatus in which a long time is required for recording, the speed to store the image data in the image memory may be much higher than the release speed of printing. Thus, when the image data is stored in the memory above a predetermined level, the mode is automatically shifted to the economy mode to suppress the image stored in the image memory to a minimum level.

(Embodiment 7)

Figure 11:
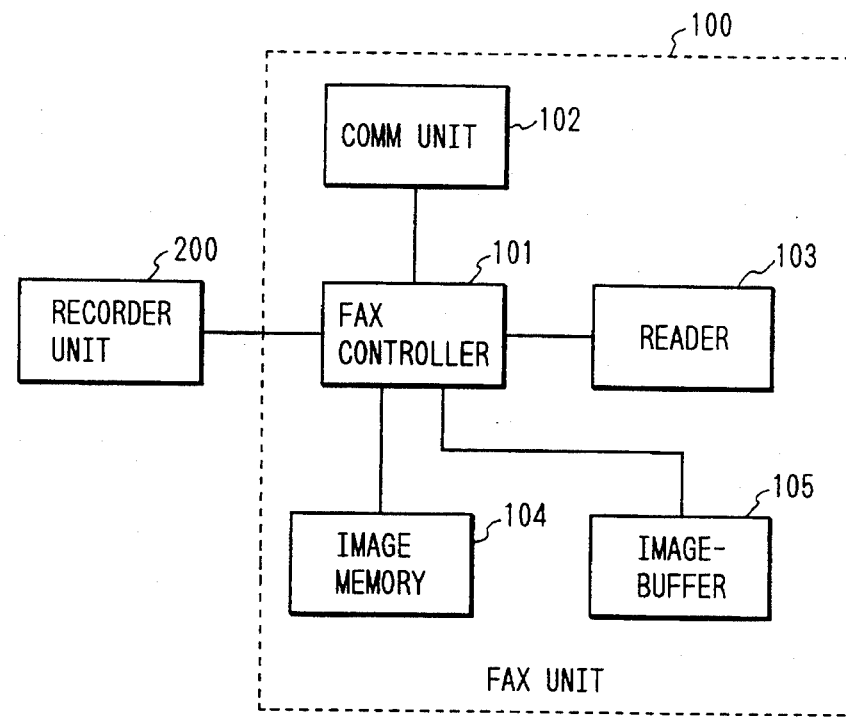
FIG. 11 shows a configuration of the facsimile unit of the facsimile apparatus in accordance with another embodiment.
Figure 12:
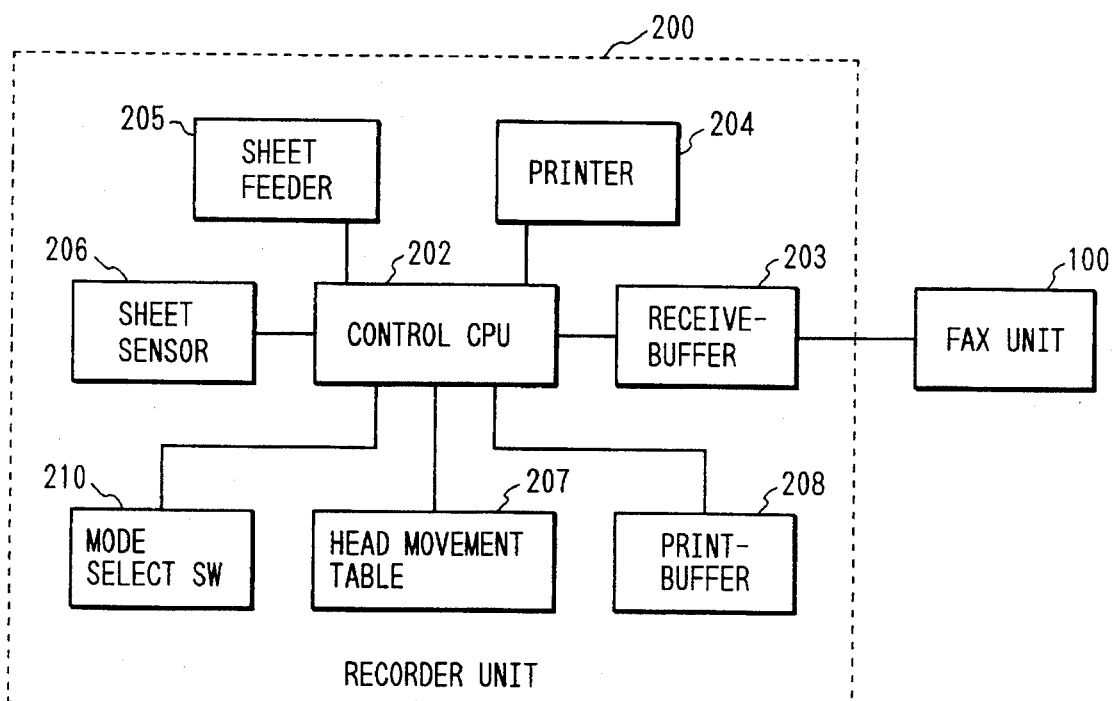
FIG. 12 shows a block diagram of a configuration of the recording unit of the facsimile apparatus in accordance with other embodiment.

FIG. 11 shows a configuration of a facsimile unit of the facsimile apparatus of the present embodiment, and FIG. 12 shows a block diagram of a configuration of a recording unit. In those figures, those elements which are designated by the same numerals as those in FIGS. 3 and 4 denote the same elements, and numeral 210 denotes a mode switch.

In the embodiments 1 and 2, when the recording unit of the system supports a printer mode in which it is operated as a printer which is a terminal device of a computer by an interface cable extending from a connector externally of the apparatus, the following problems occurs if the high quality/economy mode switch is connected to the facsimile unit.

1) Since the recording unit receives various command codes through the external interface during the operation in the printer mode, it is risky to independently prepare the high quality/economy mode setting command in the facsimile unit.

2) Since the mode switching is made for switching the recording unit, the facsimile unit interfere to the recording unit.

In the present embodiment, the mode switch is connected to the recording unit. As a result, the economy mode may be supported in the print mode. The resolution conversion which is otherwise conducted by the facsimile unit shown should be conducted in the recording unit when the data is developed to the print buffer shown in FIG. 4.

In accordance with the present invention, in the facsimile apparatus comprising the print head having longitudinally arranged dots to be scanned laterally of the record sheet and the recording unit for printing over one sheet of record sheet by longitudinally feeding the record sheet at the end of one scan, the speed of the print head in the lateral scan is increased and the print data is dropped at the same rate to increase the print speed, and the print data is dropped at the rate of increase of the scan speed of the print head to save the consumption of the ink. Since the speed of the print head is increased and the amount of image data to the recording unit is reduced, the transfer time is reduced and the combinational effect is attained.

By using the facsimile registration of the setting of the resolution in the economy mode, any resolution may be selected.

The shift to the economy means may be controlled by not only the operator but also by the read mode, the amount of remaining record medium (ink), the capacity of remaining memory, or the amount of unprinted received image memory content so that the facsimile apparatus of higher speed and higher performance is provided. Since the recording frequency is constant for the printing head, the print quality is not deteriorated.

The above embodiments have been shown and described in connection with the ink jet type recording apparatus which uses the thermal energy to form the flying droplets for recording the data. The typical construction and the operational principles thereof are preferably ones disclosed in U.S. Pat. No. 4,723,129 and U.S. Pat. No. 4,740,796. The principle and the structure are applicable to a so-called on-demand type recording system and a continuous type recording system. Particularly, however, it is suitable for the on-demand type because the principle is such that at least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development and contraction of the bubbles, the liquid (ink) is ejected through an discharge port to produce at least one droplet. The driving signal is preferably in the form of pulse because the development and the contraction of the bubbles can be effected instantaneously, and therefore the liquid (ink) is ejected with fast response.

The driving signal is preferably such as those disclosed in U.S. Pat. No. 4,463,359 and U.S. Pat. No. 4,345,262. In addition, the temperature rise rate of the heating surface is preferably such as those disclosed in U.S. Pat. No. 4,313,124.

The structure of the recording head may be those shown in U.S. Pat. No. 4,558,333 and U.S. Pat. No. 4,459,600 in which the heating portion is disposed at a bent portion, as well as the structure of the combination of the ejection outlet, liquid passage and the electro-thermal transducer disclosed in the above-mentioned patents.

In addition, the present invention is applicable to the structure disclosed in Japanese Laid-Open Patent Application No. 59-123670 in which a common slit is used as the discharge port for a plurality of electro-thermal transducers, and the structure disclosed in Japanese Laid-Open Patent Application No. 59-138461 in which an opening for absorbing a pressure wave of thermal energy is formed corresponding to the discharge port.

As a full-line type recording head having a length corresponding to a maximum width of the record medium on which the recording apparatus can record, the length may be satisfied by a combination of a plurality of recording heads disclosed herein or a single integrally constructed recording head may be used.

Further, the present invention is applicable to a replaceable chip type recording head to which the ink is supplied by electrical connection with the apparatus main body or from the apparatus main body when the recording head is mounted on the apparatus main body, or to a cartridge type recording head having an ink tank integral with the recording head.

The provision of the recovery means and/or the auxiliary means for the preliminary operation are preferable because they further stabilize the effects of the present invention. As for such means, there are capping means for the recording head, cleaning means therefor, pressing or sucking means, preliminary heating means which may be an electro-thermal transducer, an additional heating element or a combination thereof. Also, means for effecting preliminary discharge (not for the recording) may stabilize the recording operation.

Furthermore, in the foregoing embodiment, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is applied.

Further, the temperature rise due to the thermal energy is positively prevented by consuming it for the state change of the ink from the solid state to the liquid state. Other ink is solidified when it is left, to prevent the evaporation of the ink. In any case, the application of the recording signal producing thermal energy, the ink is liquefied, and the liquefied ink may be discharged. Other ink may start to be solidified at the time when it reaches the recording sheet. The present invention is also applicable to the ink which is liquefied by the application of the thermal energy. Such ink may be retained in liquid state or solid state in holes or recesses formed in a porous sheet as disclosed in Japanese Laid-Open Patent Application No. 54-56847 and Japanese Laid-Open Patent Application No. 60-71260. The sheet is faced to the electro-thermal transducers. The most effective one of the inks described above is the film boiling system.

The present invention is not limited to the ink jet recording system which use the thermal energy but it is also applicable to an ink jet system which uses a piezo-electric element.

In accordance with the present invention, the resolution of the record image may be selected, and when the resolution lower than the normal resolution is selected, the image data is dropped at the predetermined rate to the normal mode and the record scan speed is increased so that the received image can be recorded at the print speed and the print quality which the user desires.

What is claimed is:

1. An image communication apparatus capable of recording an image on a record medium at a first resolution in accordance with image data transmitted through a line by record-scanning by using record means having a plurality of recording elements arranged at a predetermined recording density, comprising: selection means for selecting a resolution of the image to be recorded by said record means;

supply means for dropping the image data at a predetermined rate when a second resolution lower than said first resolution of the image to be recorded by said record means is selected and supplying the dropped image data to said record means; and scan means for conducting the record-scanning of said record means at a high speed in accordance with said second resolution, wherein said scan means conducts the record-scanning at the second resolution at a speed of (the first resolution)/(the second resolution) times of the speed in the first resolution.

2. An image communication apparatus according to claim 1, wherein said selection means sets any resolution in the record-scan direction.

3. An image communication apparatus according to claims 1 or 2, wherein said scan means conducts the record-scanning by relatively reciprocally moving said record means to said record medium.

4. An apparatus according to claim 1, wherein said selection means selects the resolution of the image to be recorded in accordance with a resolution of the image data transmitted.

5. An apparatus according to claim 1, wherein said selection means selects the resolution of the image to be recorded in accordance with a remaining amount of recording material.

6. An apparatus according to claim 5, wherein said recording material is ink.

7. An apparatus according to claim 1, wherein said selection means selects the resolution of the image to be recorded in accordance with a remaining amount of recording agent.

8. An apparatus according to claim 1, further comprising memory means for storing the image data transmitted, wherein said selection means selects the resolution of the image to be recorded in accordance with a remaining memory capacity of said memory means.

9. An apparatus according to claim 1, further comprising memory means for storing the image data transmitted, wherein said selection means selects the resolution of the image to be recorded in accordance with a remaining memory capacity of said memory means.

10. An image communication apparatus according to claim 3, wherein said record means discharges ink to record the image.

11. An image communication apparatus according to claim 10, wherein said record means discharges the ink by causing a state change in the ink by using thermal energy.

12. An image communication apparatus according to claims 1, 2, 4, 5, 6, 7, 8 or 9, wherein said record means discharges ink to record the image.

13. An image communication apparatus according to claim 12, wherein said record means discharges the ink by causing a state change in the ink by using thermal energy.

* * * * *

UNITED STATES PATENT AND TRADEMARK OFFICE
CERTIFICATE OF CORRECTION

PATENT NO. : 5,604,597

DATED : February 18, 1997

INVENTOR(S) : TAKASHI IMAI

It is certified that error appears in the above-identified patent and that said Letters Patent is hereby corrected as shown below:

On the title page, item

AT [56] References Cited U.S. PATENT DOCUMENTS:

Please insert:

```
--5229792    7/20/93     Ono et al.
  5132711    7/21/92     Shinada et al.
  5175566   12/29/92     Ejiri et al.
  5249062    9/28/93     Ejiri et al.
  4463359    7/31/84     Ayata et al.
  4345262    8/17/82     Shirato et al.
  4313124    1/26/82     Hara
  4558333   12/10/85     Sugitani et al.
  4459600    7/10/84     Sato et al.
  4608577    8/26/86     Hori
  4723129    2/2/88      Endo et al.
  4740796    4/26/88     Endo et al.--.
```

UNITED STATES PATENT AND TRADEMARK OFFICE
CERTIFICATE OF CORRECTION

PATENT NO. : 5,604,597

DATED : February 18, 1997

INVENTOR(S) : TAKASHI IMAI

Page 2 of 2

It is certified that error appears in the above-identified patent and that said Letters Patent is hereby corrected as shown below:

AT [56] References Cited:

Please insert:

--FOREIGN PATENT DOCUMENTS

| | | |
|---|---|---|
| 59123670 | 7/17/84 | Japan |
| 59138461 | 8/8/84 | Japan |
| 6071260 | 4/23/85 | Japan |
| 5456847 | 5/8/79 | Japan--. |

COLUMN 7

Line 2, "7.7 lines/ram" should read --7.7 lines/mm--.

COLUMN 12

Line 10, "selection" should read --¶ selection--.

Signed and Sealed this

Twenty-second Day of July, 1997

Attest:

BRUCE LEHMAN

Attesting Officer

Commissioner of Patents and Trademarks